(12) United States Patent
Schmidt

(10) Patent No.: US 8,312,622 B2
(45) Date of Patent: Nov. 20, 2012

(54) PUNCHING HEAD, MACHINING TOOL WITH ONE SUCH PUNCHING HEAD AND MACHINING DEVICE WITH ONE SUCH PUNCHING HEAD OR MACHINING TOOL

(76) Inventor: Heiko Schmidt, Regensburg (DE)

( * ) Notice: Subject to any disclaimer, the term of this patent is extended or adjusted under 35 U.S.C. 154(b) by 2152 days.

(21) Appl. No.: 10/389,761

(22) Filed: Mar. 18, 2003

(65) Prior Publication Data

US 2003/0196534 A1 Oct. 23, 2003

(30) Foreign Application Priority Data

Mar. 19, 2002 (DE) .................................. 102 12 193

(51) Int. Cl.
  *B23P 19/00* (2006.01)
(52) U.S. Cl. .......................................... 29/798; 29/505
(58) Field of Classification Search .................. 29/798, 29/432, 464, 505, 525, 706, 714, 795
  See application file for complete search history.

(56) References Cited

U.S. PATENT DOCUMENTS

| | | | | |
|---|---|---|---|---|
| 1,713,974 A | * | 5/1929 | Massey | 72/441 |
| 4,574,473 A | * | 3/1986 | Sawdon | 29/798 |
| 4,610,072 A | * | 9/1986 | Muller | 29/512 |
| 5,172,467 A | * | 12/1992 | Muller | 29/716 |
| 5,813,114 A | * | 9/1998 | Blacket et al. | 29/809 |
| 6,018,863 A | * | 2/2000 | Altrock | 29/716 |

* cited by examiner

*Primary Examiner* — David Bryant
*Assistant Examiner* — Christopher Koehler
(74) *Attorney, Agent, or Firm* — Welsh Flaxman & Gitler LLC

(57) ABSTRACT

The invention relates to a novel machining tool and a punching head for use in one such tool. An internal feed channel is formed between the connection for the external feed of components and the readiness position on the joining channel at least over a partial length of a deformable or flexible internal feed, so that the run of this feed within the tool and/or the correction of the feed to the external supply can be optimally matched to the respective tool execution.

21 Claims, 7 Drawing Sheets

PUNCHING HEAD, MACHINING TOOL WITH ONE SUCH PUNCHING HEAD AND MACHINING DEVICE WITH ONE SUCH PUNCHING HEAD OR MACHINING TOOL

BACKGROUND OF THE INVENTION

The invention relates to a punching head. The invention furthermore relates to a machining tool and a machining device.

In the sense of the invention a "machining tool" is especially a deep-drawing and/or punching and/or metal-forming tool for use in a press or similar machining devices. Machining tools of this type are known and are used in the production of workpieces in the form of components for motor vehicle bodies.

Fundamentally these machining tools are also known with punching heads or devices which are located in the tool and which are used for attaching nuts or nut-like components. Nuts in the sense of the invention are especially punch nuts and/or rivet nuts and/or insert nuts. Nut-like components in the sense of the invention are nuts, but also these components with a polygonal or cylindrical body and especially also those in which the axial length of the component body is smaller than the maximum diameter of this body. Nut-like components in this sense are also sliding or guide bushings with bushing bodies made similarly to the bodies of punch or insert nuts, but with an opening without a thread.

In the sense of the invention a "punching head" is defined as a device with which insertion (joining) and anchoring of fasteners, for example bolts or nuts or bolt-like or nut-like components, for example threaded bolts, unthreaded bolts, punch nuts, rivet nuts, insert nuts or sleeves is possible.

The object of the invention is to devise a machining tool which with high operating reliability with respect to at least one punching head which offers simplified execution and also improves freedom of configuration with respect to arrangement and orientation of the punching head.

SUMMARY OF THE INVENTION

In the invention, the feed of the fastener to the respective punching head and the positioning of these components at the respective transfer or readiness position of the punching head take place without elastic positioning elements such as catches or the like, but solely by delivery air, optionally supported by permanent magnets and/or negative pressure. This yields an especially simple structure. One special advantage of the invention is that the internal feed channel is formed between the connection for the external feed of components and the readiness position on the joining channel at least over a partial length of a deformable or flexible internal feed, so that the run of this feed within the tool and/or the connection of the feed to the external supply can be optimally matched to the respective tool execution, in the construction of the respective tool therefore the run of a rigid guide need not be considered, as is the case in known punching heads which have a rigid, straight feed, or with increased engineering effort an angled, but then likewise rigid internal feed.

The punching head as claimed in the invention is used in the conventional manner for inserting fasteners such as bolts or nuts or bolt-like or nut-like components which can also be called joining parts, into workpieces. These fasteners or joining parts are supplied to the punching head via an external feed with compressed air (delivery air). In the guide on the punching head side the fasteners or joining parts are then moved to a readiness position from which they are inserted into the workpiece, for example in one made of sheet metal or flat material, via a joining channel.

The means for moving the fasteners within the punching head guide to the readiness position are formed by the external delivery air or the external delivery air flow which is produced for example by at least one compressed air nozzle in the supply unit for the fasteners or joining parts and/or by internal delivery air or an internal delivery air flow which is provided on or in the area of the punching head by at least one air exit nozzle there.

BRIEF DESCRIPTION OF THE DRAWINGS

The invention is detailed below using the figures on embodiments.

DETAILED DESCRIPTION OF THE INVENTION

Figure 1:
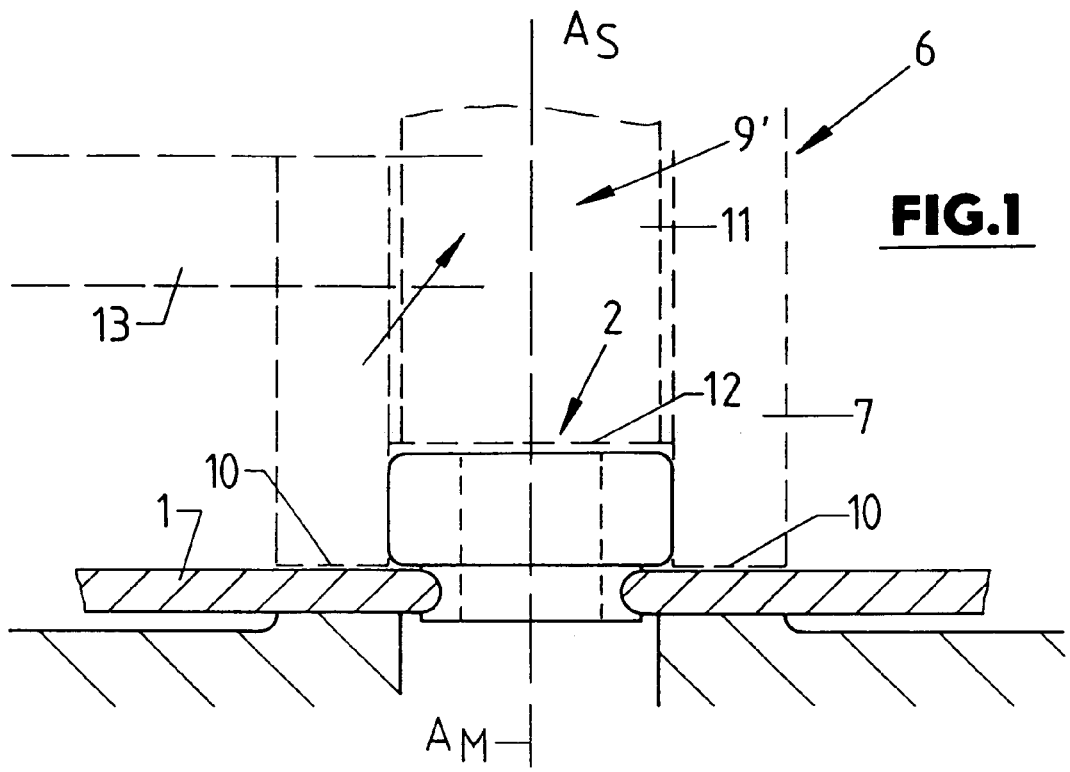
FIG. 1 shows in simplified form a component or fastener in the form of a nut together with a sheet metal workpiece.
Figure 4:
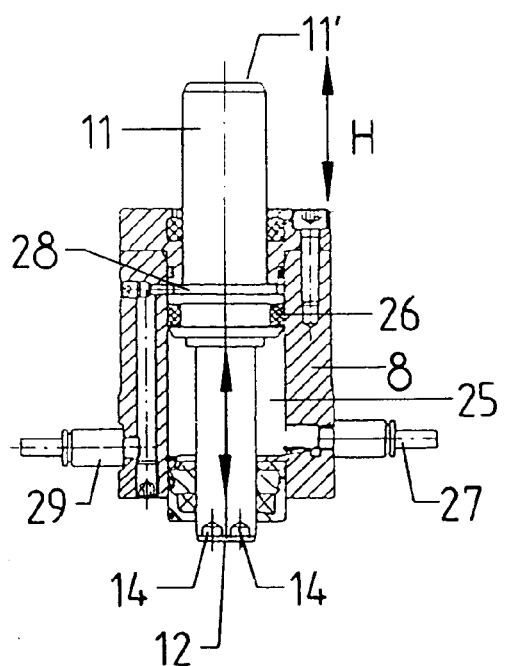
FIG. 4 shows in an individual representation and in a lengthwise section the cylinder-like housing of the guide for the plunger of the punching head of FIGS. 2 and 3.
Figure 5:
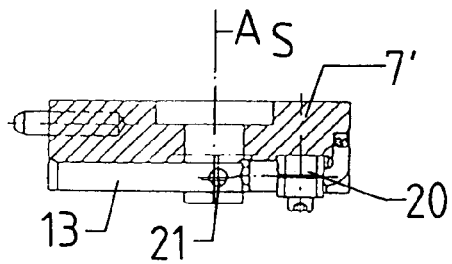
FIGS. 5 and 6 show in a lengthwise section and in cross section the upper part of the two-part head piece of the punching head of FIGS. 2 and 3.
Figure 6:
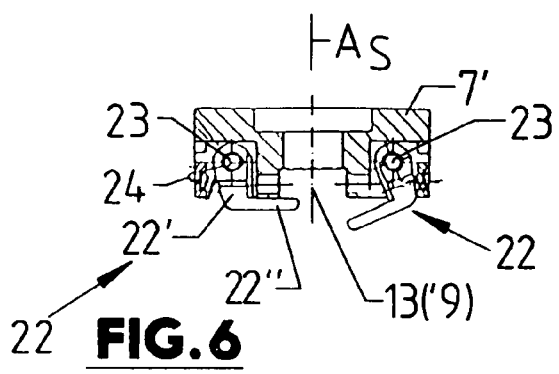

In FIG. 1 the workpiece is of sheet metal, for example a punched or bent part of sheet steel. A fastener in the form of a nut 2 is anchored into the opening of the workpiece 1 by joining and subsequent pressing.

A blank holder is labeled 3 and the lower part of a multipart tool 5 is labeled 4 and is for example a deep drawing and/or punching and/or metal-forming tool and is used for producing the workpiece 1 and at the same time also for joining and fixing the nut 2 which is made as an insert nut. The tool 5 has a punching head 6 which is attached to the blank holder 3 in this embodiment for inserting the nut into the workpiece 1.

The punching head 6 includes a front head section or head piece 7 which is made in the embodiment shown in two parts consisting of parts 7' and 7", and of the cylindrical housing 8 which stands away over the top of the head piece 7. In the head piece 7 or in the lower part 7" of this head piece a vertical joining channel 9 is formed which is open on the bottom of the head piece 7, in the area of an annular contact surface 9. In the joining channel 9 and in the extension which coaxially adjoins this joining channel to the top, there is a plunger 11 which can be moved by a given stroke (double arrow H) in the plunger axis $A_S$, between an initial position in which the lower plunger end 12 is located above the loading channel 13 which is likewise made in the head piece 7 or in the part 7" and which intersects the joining channel 9, and in which thus the loading channel 13 to the joining channel 9 or to the readiness position 9' in the joining channel 9 is open underneath the plunger surface 12, and the position in which the plunger 11 blocks the loading channel 13 toward the joining channel 9 and the plunger end 12 is located in the vicinity of the lower opening of the joining channel 9 or the annular surface 10 there in the joining and press position. On the plunger end 12 in the embodiment shown there are two permanent magnets 14 which are located offset radially to the plunger axis $A_S$ and are offset by 180° against one another relative to this axis.

The loading channel 13 which runs radially to the axis $A_S$ with its longitudinal extension is a component of an internal feed, is used in the manner detailed below for feed of nuts 2 to the readiness position 9' and passes into the channel 15 of a flexible feed 16 which is made of a flexible material, preferably of plastic, and which is connected to the head piece 7 by means of a coupling piece 17. The cross section both of the joining channel 9 and also of the channel 15 of the feed 16 is matched to the shape of the nuts 2 such that in these channels they can have only one given orientation, oriented with their axis $A_M$ perpendicular to the lengthwise extension of the respective channel such that this axis $A_M$ of each nut 2 which is located in the loading channel 13 is parallel to the plunger axis $A_S$. The flexible feed 16 extends as far as the edge of the tool 5 or to an area of this tool where the feed 16 is connected via a suitable coupling 18 to the external supply hose 19 which has a channel with the cross section likewise matched to the shape of the nuts and via which the nuts 2 are supplied to the punching head 6.

At the readiness position 9' there is a sensor 20 which in the presence of a nut 2 delivers to this readiness position 9' a corresponding sensor signal which indicates the readiness of the punching head 6 for inserting a nut 2 into the workpiece 1 which is ready under the punching head 6. In the absence of a sensor signal 20 the press which has the tool 5 is stopped.

At the readiness position 9' there are furthermore two permanent magnets 21 which are located laterally from this readiness position and are offset around the axis parallel to the axis $A_S$. The permanent magnets 21 and the axes around which the permanent magnets are arranged 180° offset against one another, are slightly offset relative to the axis $A_S$ to the closed end of the readiness position 9' which is opposite the joining channel 9, where the sensor 20 is also located, so that the respective nut 2 which is produced from ferromagnetic material (steel) is moved centered into the readiness position 9' and is also held there by the permanent magnets 21.

As the figures show, the plunger end 12 in the initial position of the plunger 11 has a distance from the plane of the top of the joining channel 9 and thus a distance a) from the top of the nut 2 which is ready at the readiness position 9'. At the readiness position 9 there are furthermore two catches 22 which in the embodiment shown are each made as an angle piece with two legs 22' and 22" and which are pivotally supported on the free end of the leg 22' around the axis 23 parallel to the lengthwise extension of the joining channel 9, against the action of a reset spring 24. With its legs 22" the catches 22 project laterally into the joining channel 9 on the transition to the readiness position 9' and with the top of their leg 22" facing the leg 22' in the initial position form a guide surface for the nuts 2, i.e. the continuation of the lower guide surface of the loading channel 13. When the plunger 12 moves with a nut 2 which is entrained with the plunger 12 and which ad joins the plunger surface 12 out of the readiness position 9' into the joining channel 9, the two catches 22 are pressed to the side against the action of the reset springs 24. The joints 23 are located in the representation chosen in the figures above the leg 22", i.e. at a distance from the plane of the annular surface 10 which is greater than the corresponding distance which the legs 22" have from this plane $E_R$.

In the embodiment shown, the loading channel 13 and the readiness position 9' are made in the upper head piece part 7'. In this head piece part there are also two catches 22 and they are pivotally supported with the joints 23.

The motion of the plunger 11 out of the initial position into the joining position takes place in the conventional manner in that the tool or the press acts on the end 11' of the plunger projecting over the housing 8, i.e. for each working stroke of the press, first the punching head together with the blank holder 3 is moved toward the bottom 4 of the tool so that the workpiece 1 is clamped on the area at which a nut 2 is to be inserted between the punching head 6 or the annular contact surface 10 and the area 4' of the bottom part of the tool. In the further working stroke of the press then the top part of the tool which is not shown acts on the end 11' of the plunger 12 so that the plunger 11 together with the nut 2 provided on the plunger end 12 moves as the catch 22 is pressed from overhead into the joining channel 9 for joining and pressing the nut 2 in the workpiece 1.

The return stroke of the plunger 11 from the joining position into its initial position can take place for example by a reset spring which is held in the housing 8, but in the embodiment shown it takes place by compressed air. For this purpose the housing 8 forms a cylinder with a piston 26 attached to the plunger 11, able to move in its cylinder space 25. The annular cylinder space 25 which surrounds the plunger 11 underneath the piston 26, i.e. on the side facing the head piece 7, is connected via a connection 27 to a compressed air source, for example permanently. This compressed air source is thus made such that it enables volume equalization such that the cylinder space 25 acts as a "pneumatic spring" which pretensions the plunger 11 into its initial position and which is pressed from overhead out of the initial position when the plunger 11 moves.

Above the piston 26, i.e. on the side of this piston facing away from the head piece 7, in the housing 8 a second annular cylinder space 28 which surrounds the plunger 11 is formed and can be exposed to compressed air in a controlled manner via a connection 29, such that the plunger 11 is moved out of its initial position into the joining position or is held in this joining position in order to block the joining channel 9 or the readiness position 9' there relative to the loading channel 13, for example in case of problems or in those cases in which a nut is not to be inserted into the workpiece 1 with the punching head 6. This control of the plunger 11 via the cylinder space 28 among others makes it possible to produce workpieces 1 selectively with or without nuts 2 using the same tool 5 and/or for several punching heads 6 provided on the tool 5 to provide nuts 2 at certain areas of the respective workpiece 1 or selectively also omit them.

The pressure of the controlled compressed air for the cylinder space 28 is chosen such that in spite of the pressure which prevails in the cylinder space 25 the plunger 11 is moved into its joining position and/or held there. Basically it is also possible to control the compressed air feed to the cylinder space 25 such that the cylinder space 25 is vented when the cylinder space 28 is supplied with compressed air in a controlled manner.

The feed of the nuts 2 from an external supply unit via the supply hose 19 on the punching head 6 takes place for example individually such that each nut 2 is injected into the loading channel 13 using compressed air via the supply hose 19 and the feed 16 and finally also travels to the readiness position 9' via this delivery air. The injection can take place independently of the motion of the tool or the press of course such that at the start of each working stroke of the press and thus at the start of the motion of the plunger 11 out of the initial position in the direction of the joining position a nut 2 is ready at the readiness position 9'. Regardless of this requirement the injection of the nuts 2 can take place independently of the motion of the press or the tool, for example in the form that a nut 2 is injected and is located in the loading channel 13 before the plunger 11 has moved back into its initial position at the end of the working stroke. The nut 2 then lies against the outside surface of the plunger which is moving back and blocking the readiness position 9' so that the nut 2 is moved into the readiness position 9' by the delivery air as soon as the plunger 11 has reached its initial position. The external delivery air is then for example permanently present and is turned off as soon as the signal of the sensor 20 is present.

The external delivery air emerges for example at the open end of the joining channel 9 or in the head piece 7 there is additionally an exit channel for this delivery air. The permanent magnets 21 center and also hold the respective nut 2 at the readiness position 9', before the plunger 11 is moved again out of its initial position in the direction of the joining position. In the loading channel 13 there are no catches or similar elements at all which would have to be pressed from the top when the nuts 2 continue to move especially also into the readiness position 9'. Rather, the respective nut is moved as far as the readiness position 9 solely by the external delivery air flow without overcoming catches or the like and is held in position there by the external delivery air flow and/or the permanent magnets 21. Because the plunger end 12 with the permanent magnets 14 in the initial position of the plunger is spaced apart from the top of the respective nut 2 (distance a), the position and location of the nut 2 in the readiness position 9' is prevented from being adversely affected by this permanent magnet 14. Basically it is also possible to provide for example projection-like contacts for the top of the respective nut 2 at the readiness position 9', the contacts are then pressed elastically to the side by the plunger 11 moving out of the initial position into the joining position.

Thus, for example it is possible to make the external delivery air as continuous air and/or to deliver the nuts 2 with this external delivery air as continuous air or as injection air to the punching head 6 such that there are several nuts 2 in the loading channel 13 there. Especially when the nuts 2 are injected onto the punching head 6 before the return of the plunger 11 to its initial position it is also possible to check the presence of at least one nut 2 in the loading channel at a given time by means of a sensor 30 which is located in the loading channel 13, and when a nut 2 is not present, to inject a nut 2 again into the punching head 6 before the next working stroke begins.

Figure 2:
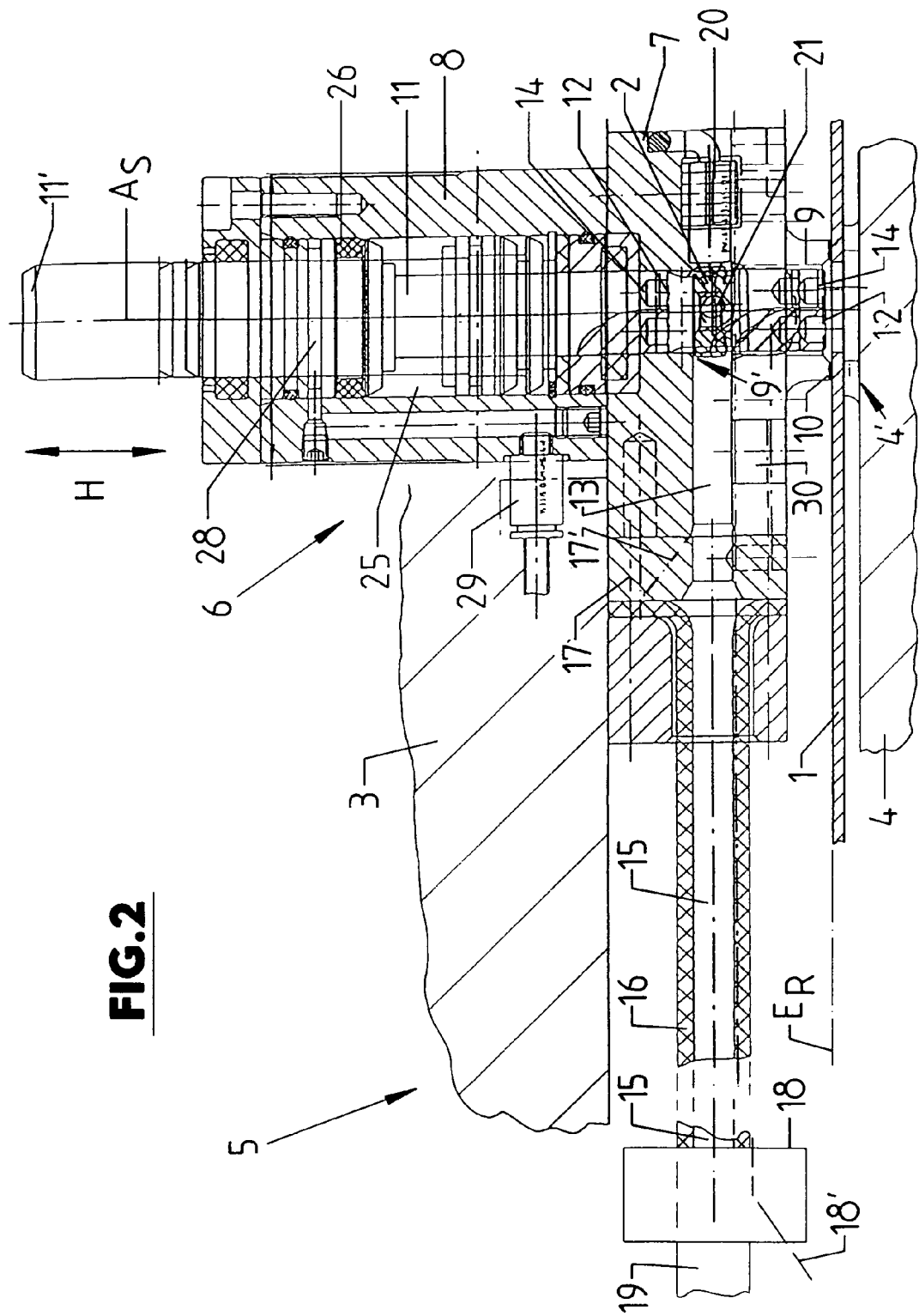
FIG. 2 shows the blank holder and the bottom part of the machining tool for use in a press, together with a punching head for processing the nuts of FIG. 1, in a section.
Figure 3:
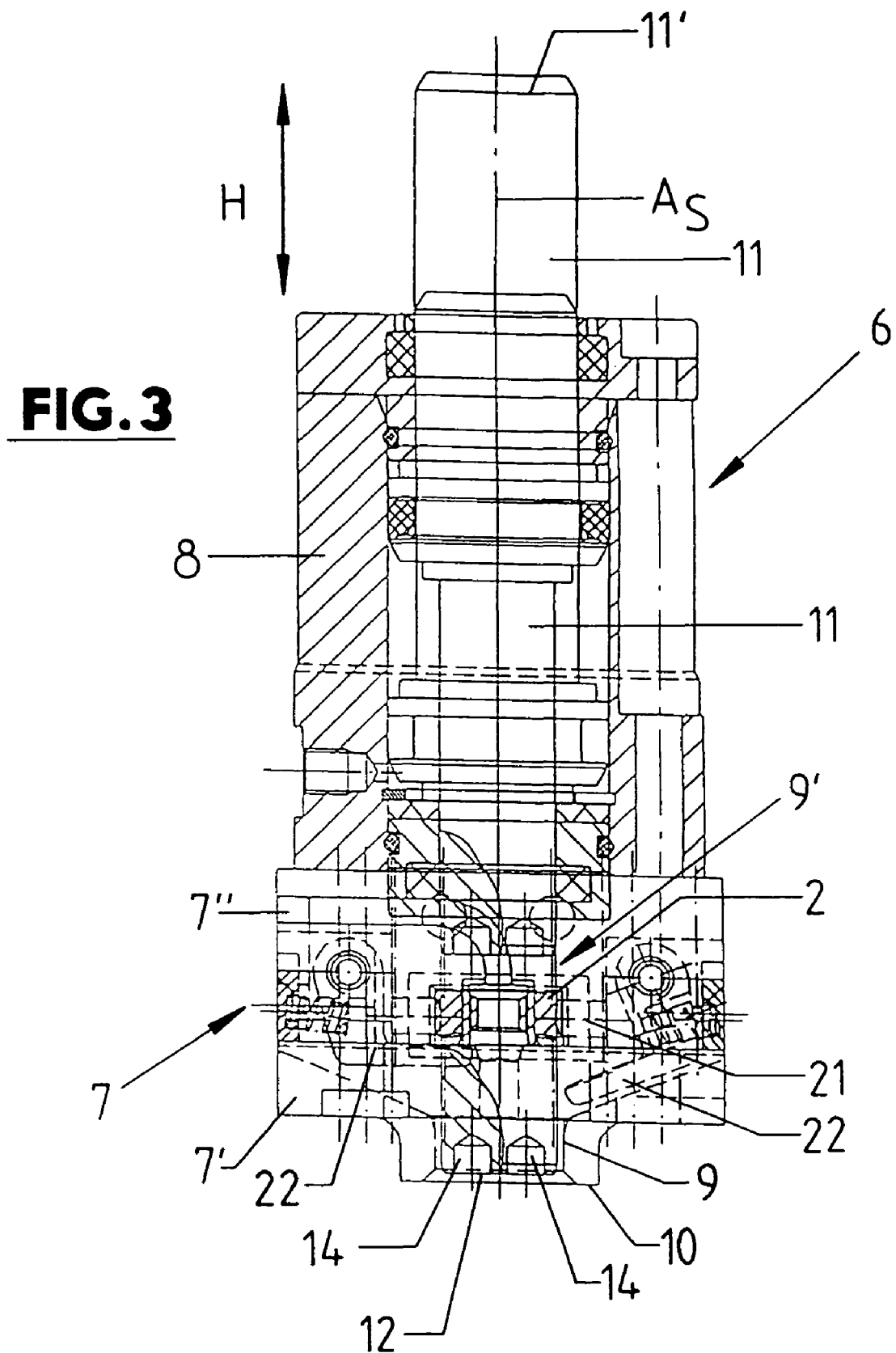
FIG. 3 shows the punching head of FIG. 2 in a cross section perpendicular to the section of FIG. 2.

To support the external delivery air, an internal delivery air flow can also be produced in the direction of the readiness position 9' for example by at least one compressed air exit nozzle on at least one coupling piece 17 or 18, as is indicated in FIG. 2 by 17' and 18'. The air exit openings in channels 13 and 15 provide for decoupling of the external delivery air flow and the internal delivery air flow, i.e. preventing the internal delivery air flow from counteracting the external delivery air flow.

Furthermore it is possible, instead of the permanent magnets 14 or in addition to these permanent magnets, on the plunger end 12 to provide at least one nozzle opening which can be exposed to negative pressure, in order to keep the respective nut 2 on the plunger end 12 even if it consists of a nonmagnetic material, then this negative pressure being controlled such that it is turned on only with the plunger moving out of the initial position. Likewise it is also possible, instead of the permanent magnets 21 or in addition to them, to provide at the readiness position 9' vacuum openings which hold and center the respective nut 2 at the readiness position 9' even if this nut consists of nonmagnetizable material.

In particular, the vacuum or the negative pressure is turned on at at least one negative pressure exit opening provided on the plunger surface 12 only when the pertinent nut 2 is located at the readiness position 9', in order not to adversely affect delivery of the nut 2 to the readiness position 9' by the delivery air.

Furthermore, it was assumed above that the punching head 2 is located on the blank holder of the tool 5. Of course, the tool can also be built differently, thus the punching head 6 can be provided spring-mounted on one tool part, for example on the upper part of the two-part tool which is not shown in the Figures. Of course it is also possible to use the punching head 6 for example in turned form, i.e. with the annular contact surface 10 lying at the top on the bottom part of the tool or on a spring bottom.

Figure 7:
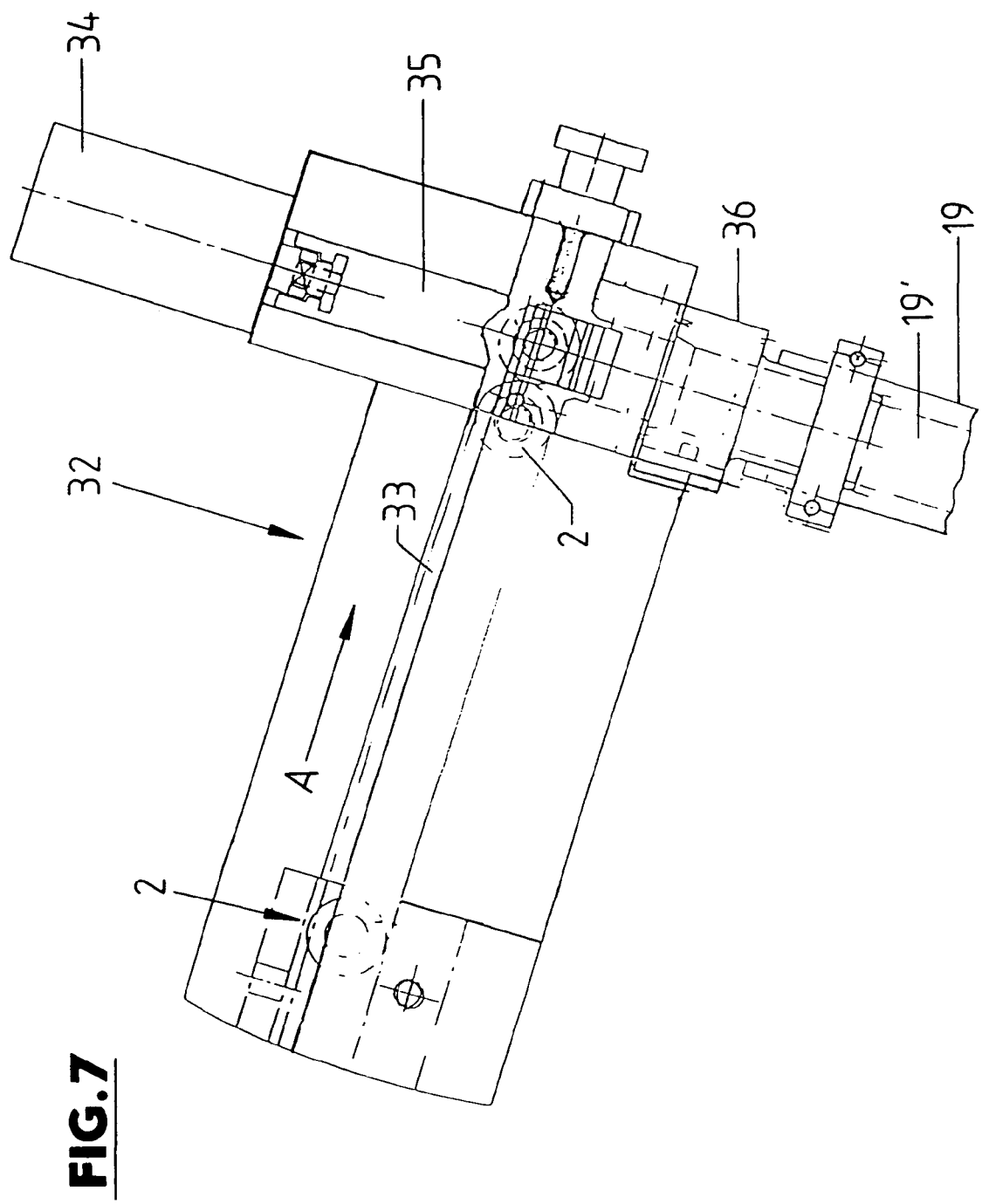
FIGS. 7 and 8 shows in a simplified view and in a side view as well as in a section a feed or injection means of an external supply unit for nuts for inserting these nuts into the external supply hose which leads to the punching head.
Figure 8:
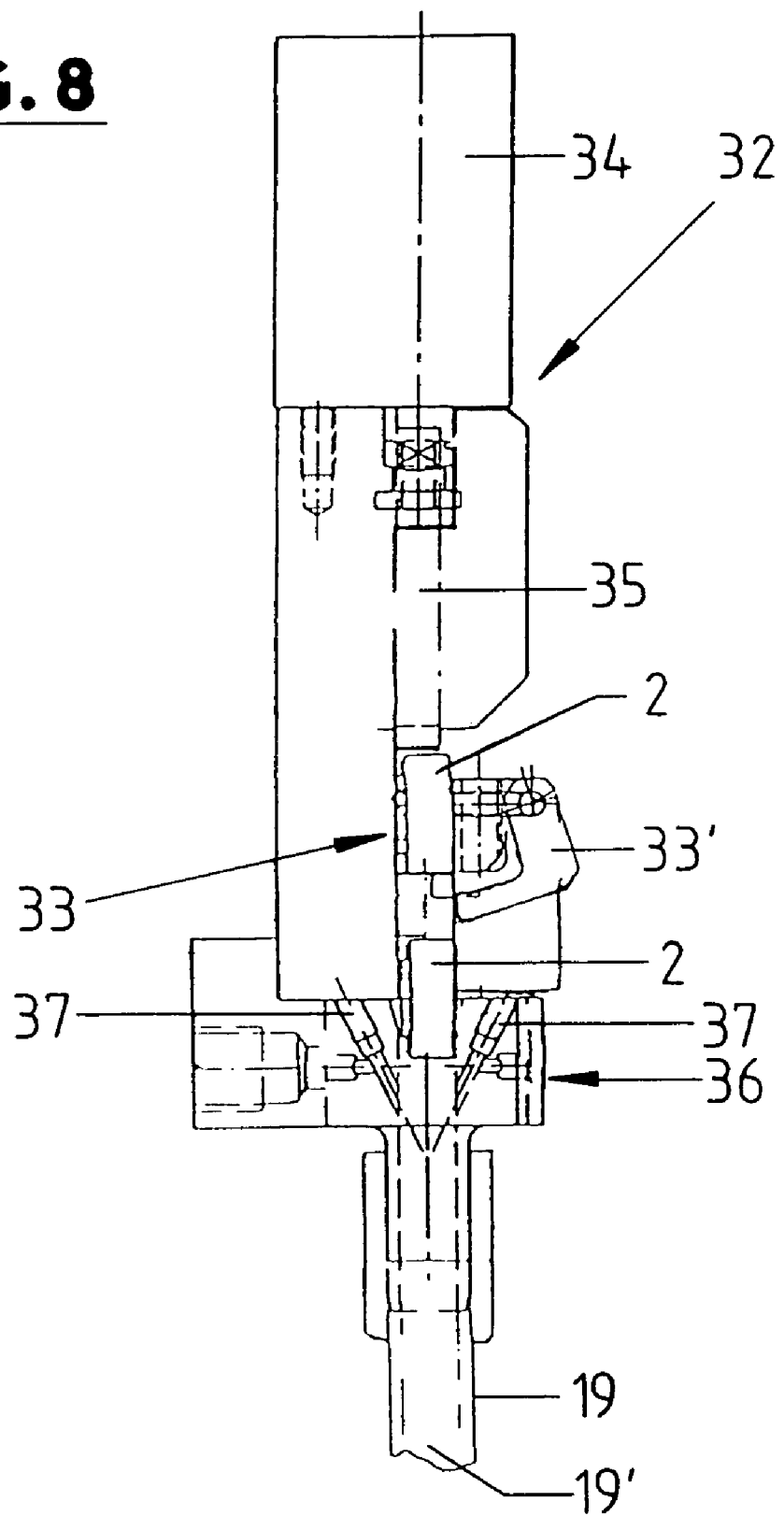

FIGS. 7 and 8 in a side view and in a sectional show a feed or injection position or means of an external supply unit which is not otherwise detailed and via which the nuts 2 are inserted into the external supply hose 19 in succession.

This feed and injection means labelled 32 generally in FIGS. 7 and 8 consists essentially of a guide 33 which is tilted relative to the horizontal in the embodiment shown, and into which the nuts 2 are inserted for example via a vibration head from a disordered set and in which the nuts are moved by the tilt in the direction of the arrow A by the force of gravity, such that the nuts 2 in the guide 33 form a row in which the nuts 2 tightly ad join one another, oriented with the axis of their thread perpendicular to the lengthwise direction of the guide 33. The end of the guide 33 on one side ad joins the end of the supply hose 19 away from the punching head 6 such that the lengthwise extension of the supply hose 19 or of the channel 19' which is formed in this supply hose and which is matched in its cross section to the shape of the nuts 2 is perpendicular to the axis of the guide 33. On the side of the guide 33 opposite the supply hose 19 there is an actuating element 34 for a ram 35 with which by activating the actuating element 34 the nut 2 which is already at the pertinent end of the guide 33 is moved into the channel 19'. The guide there is formed partially by an elastic catch 33'.

On the connecting piece 36 with which the supply hose 19 is connected to the guide 33, there are compressed air exit nozzles 37 which are connected for example permanently to a compressed air source which is not shown, for producing the delivery air with which each nut 2 is delivered or injected by the feed unit 32 to the punching head 6. Each nut 2 is moved with the ram 35 into the channel 19' so far that this nut is located in the flow direction of the delivery air behind the nozzles 37 and thus entrained with the delivery air emerging from the nozzles 37 and is injected onto the punching head 6. The ram 35 is preferably controlled by the actuating element 34 such that the ram 35 normally closes the channel 19' and is moved briefly out of the channel 19' only for injection of a new nut 2 and then is moved back again into the channel 19' together with the new nut 2.

Figure 9:
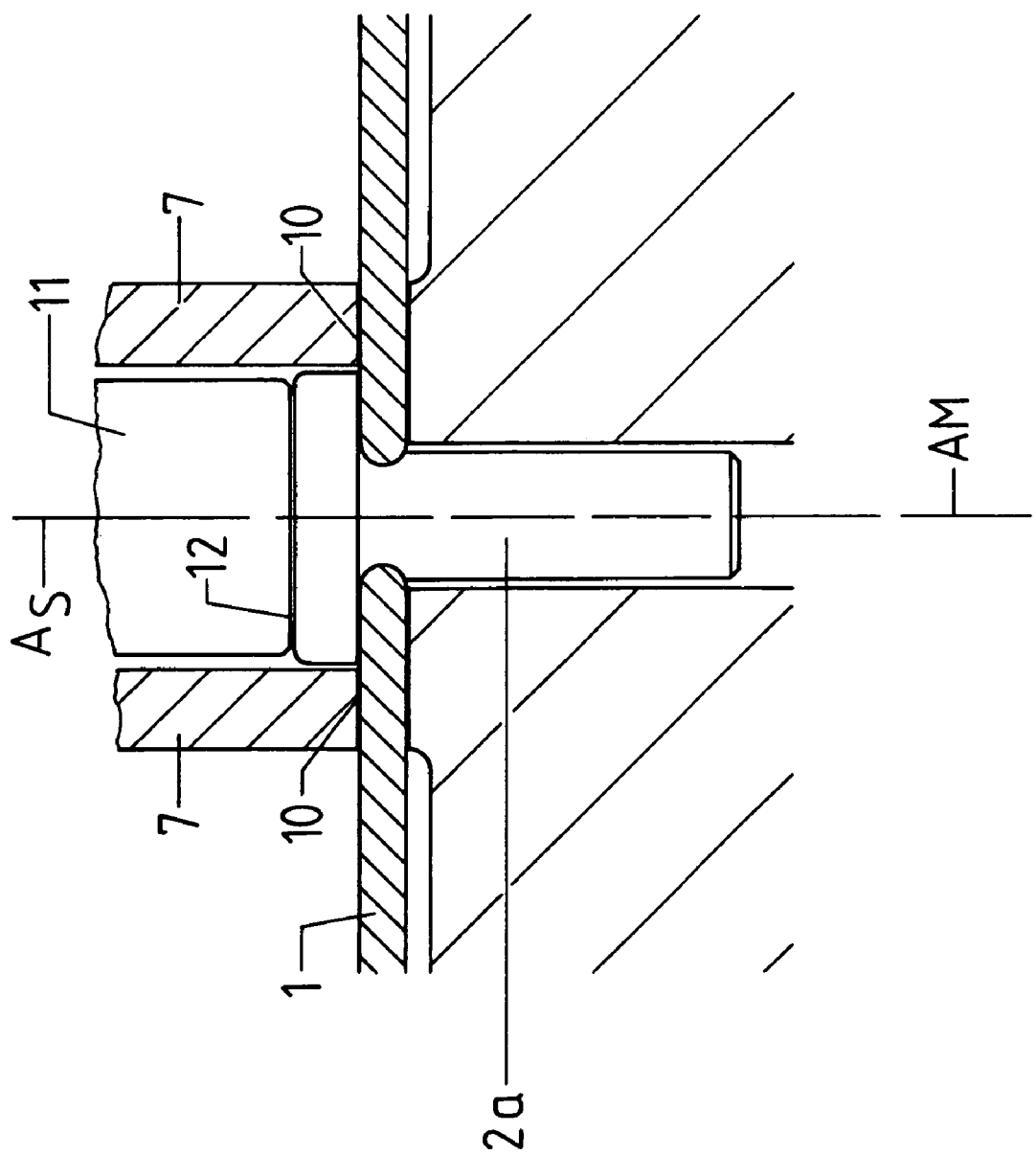
FIG. 9 shows in a simplified representation a fastener in the form of a bolt, together with a sheet metal workpiece.
Figure 10:
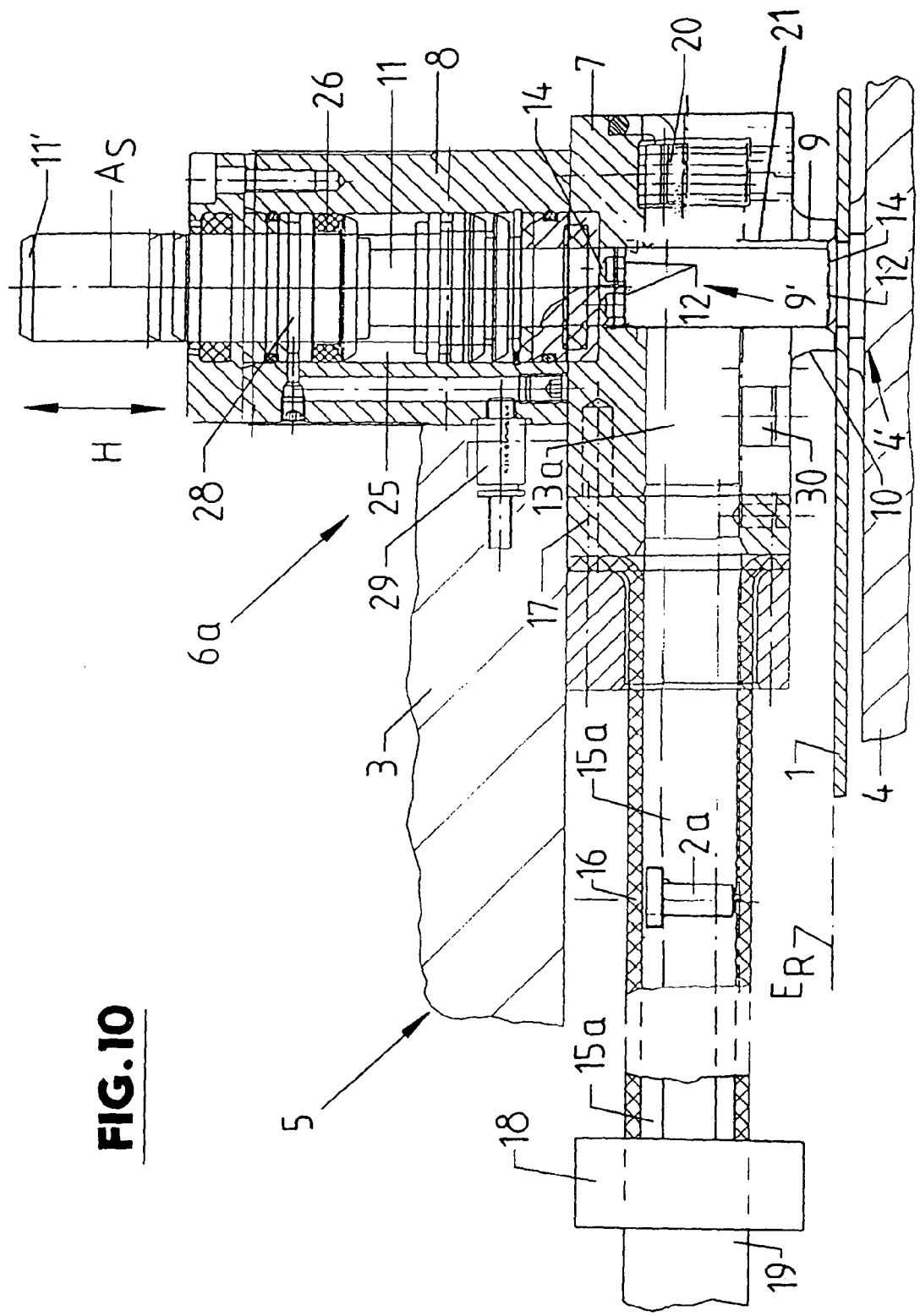
FIG. 10 shows a view similar to FIG. 2, but for a punching head made for processing of connecting pins.

FIG. 9 shows in a representation similar to FIG. 1 a fastener 2a which is anchored in the workpiece 1 and which is made as a pin. The tool 5 with a punching head 6a is again reproduced in FIG. 10. This punching head 6a differs from the punching head 6 simply in that the punching head 6a is made for processing of pin-like fasteners 2a. They are supplied to the punching head 6a via this external supply hose 19a and travel via a punching head-side feed 16a and the loading channel 13a to the readiness position 9', the pin-like fasteners with their pin axes being oriented perpendicular to the delivery direction. The loading channel 13, the internal channel 15 and the guide channel which is formed in the external supply hose 19a are matched to the shape which the pin-shaped fasteners 2a have, i.e. in cross section made roughly T-shaped.

It was assumed above that the channel 19' is closed by the ram 35. Other means, for example, one or more flaps, can be provided to at least partially close the channel 19' after insertion of a joining part (2 or 2a) in the flow direction of the delivery air before the air inlet nozzles 37.

| Reference number list | |
|---|---|
| 1 | workpiece |
| 2 | nut |
| 2a | pin |
| 3 | blank holder |
| 4 | bottom part of the tool |
| 4' | tool area |
| 5 | tool |
| 6, 6a | punching head |
| 7 | head piece of the punching head |
| 7' | top head piece part |
| 7" | bottom head piece part |
| 8 | housing |
| 9 | joining channel |
| 9' | readiness position |
| 10 | annular contact surface |
| 11 | plunger |
| 11' | top plunger end |
| 12 | bottom plunger end |
| 13, 13a | loading channel |
| 14 | permanent magnet |
| 15, 15a | channel |
| 16, 16a | feed |
| 17 | coupling piece |
| 17' | compressed air exit nozzle |
| 18 | coupling piece |
| 18' | compressed air outlet nozzle |
| 19, 19a | external supply hose |
| 19' | channel of the external supply hose |
| 20 | sensor |
| 21 | permanent magnet |
| 22 | catch |
| 22', 22" | leg |
| 23 | joint |
| 24 | reset spring |
| 25 | cylinder space |
| 26 | piston |
| 27 | connection |
| 28 | cylinder space |
| 29 | connection |
| 30 | sensor |
| 32 | delivery unit |
| 33 | guide |
| 33' | spring-mounted catch |
| 34 | actuating element |
| 35 | ram |
| 36 | connecting piece |
| 37 | compressed air nozzle |
| a | distance |
| A | direction of motion |
| $A_S$ | plunger axis |
| $A_M$ | axis of the nut |
| $E_R$ | plane of the annular contact surface 10 |

The invention claimed is:

1. A punching head for insertion of joining parts into workpieces, the punching head having a loading channel, which is a component of a feed for feeding the joining parts from an external supply unit and which ends at a readiness position formed in a joining channel, the joining channel having a joining channel inlet at an axial distance from the readiness position, and with a plunger which can be moved between an initial position in which a plunger surface of the plunger is located outside the joining channel and outside the readiness position on a side of the readiness position facing away from the joining opening, and a joining position, in which the plunger with the plunger surface is located in the joining channel, means on the punching head or in the area of the punching head for moving the joining parts within the punching head, wherein the means for moving the joining parts within the loading channel is delivery air produced on the punching head or in the area of the punching head, the loading channel extending impediment free into the readiness position, and spring loaded catches having top sides in the readiness position, the top sides of the catches forming impediment free continuations of the guide surface of the loading channel in the readiness position, such that the top sides of the catches are arranged in a common plane with the at least one guide surface of the loading channel, wherein each catch has a first leg and a second leg and is pivotally supported against the action of a reset spring on the first leg, the second leg projecting laterally into the joining channel, the top side of the second leg forming the continuation of the guide surface of the loading channel in the readiness position.

2. The punching head as claimed in claim 1, further comprising means for blocking of the readiness position.

3. Punching head as claimed in claim 2, wherein the means for blocking the readiness position are formed by the plunger of the punching head or by another mechanical element which can be moved into the readiness position or into the loading channel for blocking.

4. The punching head as claimed in claim 1, wherein the joining parts are supplied via the external feed to the punching head by compressed air wherein there are means for moving the respective joining part within the punching head to the readiness position and wherein the means are formed by the delivery air which is produced on the punching head in an area of the punching head.

5. The punching head as claimed in claim 1, wherein the punching head is formed at least on a partial length by a tube section of a flexible material.

6. The punching head as claimed in claim 1, wherein the punching head is formed by a loading channel which is formed in a housing part of the punching head and which ends at the readiness position and from a guide piece or tube piece of flexible material, which forms a channel for the joining parts.

7. The punching head as claimed in claim 1, wherein the joining parts are supplied individually to the punching head.

8. The punching head as claimed in claim 1, further comprising by control means for shutting off by at least one permanent magnet at least one vacuum opening the delivery air when a joining part is positioned at the readiness position.

9. The punching head as claimed in claim 1, further comprising means for accurate positioning of the respective joining part at the readiness position.

10. The punching head as claimed in claim 9, wherein the means for accurate positioning are formed.

11. The punching head as claimed in claim 1, wherein the plunger surface in the initial position of the plunger is spaced away from the readiness position or from the joining part which is ready at the readiness position.

12. The punching head as claimed in claim 11, wherein a distance of the plunger surface of the plunger located in the initial position from the readiness position or a joining part is greater than one third of the dimension which the joining part has in a direction of the plunger axis ($A_S$).

13. The punching head as claimed in claim 1, wherein on the plunger surface there are means for holding the joining part, the means is at least one permanent magnet or a vacuum opening.

14. The punching head as claimed in claim 1, wherein there are at least two permanent magnets which are radially offset relative to the plunger axis ($A_S$).

15. The punching head as claimed in claim 1, further comprising means for resetting the plunger into its initial position, these means being formed by a pressurized medium, compressed air in the first cylinder space, in which there is a piston which is connected to the plunger to be able to move axially.

16. The punching head as claimed claim 1, further comprising means for moving the plunger out of its initial position into the joining position or for holding the plunger in this joining position, these means being formed by a piston which is connected to the plunger, and which is provided to be able to move in a second cylinder space which can be exposed to a pressurized medium, for example compressed air.

17. The punching head as claimed in claim 1, wherein the joining parts are injected on at least one punching head regardless of the position of the plunger.

18. The punching head as claimed in claim 17, wherein the respective joining part is injected at latest when the plunger has assumed its initial position.

19. The punching head as claimed in claim 1, further comprising a feed or injection means, with an actuating element, with which the joining part can be inserted into a channel of the external feed in a position which is provided in the flow direction of the delivery air after the air inlet nozzles, and means for closing the channel after insertion of the joining part in the flow direction of the delivery air before the air inlet nozzles.

20. A machining tool, for use in a press, comprising
at least one punching head as claimed in claim 1,
at least two tool parts which can move opposite one another,
said at least one punching head on one of said tool parts.

21. A punching head as claimed in claim 1, wherein said plunger can be moved in a direction of a plunger axis ($A_S$), the longitudinal extension of the loading channel extending radial to the plunger axis ($A_S$).

* * * * *